US008335788B1

(12) United States Patent
Fromme et al.

(10) Patent No.: US 8,335,788 B1
(45) Date of Patent: Dec. 18, 2012

(54) IDENTIFICATION OF CONTIGUOUS SPACES

(75) Inventors: Chris A. Fromme, Charlotte, NC (US);
James Wimmers, Lincolnton, NC (US)

(73) Assignee: Bank of America Corporation,
Charlotte, NC (US)

( * ) Notice: Subject to any disclaimer, the term of this patent is extended or adjusted under 35 U.S.C. 154(b) by 890 days.

(21) Appl. No.: 12/259,543

(22) Filed: Oct. 28, 2008

(51) Int. Cl.
*G06F 17/30* (2006.01)
(52) U.S. Cl. ...................................... 707/732
(58) Field of Classification Search .......... None
See application file for complete search history.

(56) References Cited

U.S. PATENT DOCUMENTS

| 6,798,926 | B2 * | 9/2004 | Hiramatsu | 382/291 |
| 2005/0030309 | A1 * | 2/2005 | Gettman et al. | 345/419 |
| 2006/0009862 | A1 * | 1/2006 | Imhof et al. | 700/19 |
| 2008/0163504 | A1 * | 7/2008 | Smith et al. | 33/268 |

* cited by examiner

*Primary Examiner* — Bai D. Vu
(74) *Attorney, Agent, or Firm* — Michael A. Springs; Moore and Van Allen, PLLC; Jeffrey R. Gray

(57) ABSTRACT

An automated contiguous space identification feature for businesses is provided. Embodiments of the present invention provide a method and system of converting the value assigned to a work space in a coordinate system from an absolute position value to a unique relative position value. Such conversion enables identification of contiguous work spaces present within a defined area. An embodiment can be implemented via a stand-alone computing system or such a system interconnected with other platforms or data stores by a network, such as a corporate intranet, a local area network, or the Internet.

30 Claims, 6 Drawing Sheets

IDENTIFICATION OF CONTIGUOUS SPACES

BACKGROUND

Business entities must create and maintain methods and systems for keeping track of work spaces, which are any areas used for conducting business. Large business entities (or "businesses") must often organize and maintain large quantities of work spaces, which makes the tracking of work spaces complex and difficult. This task can increase even more in complexity if different types of work spaces are being tracked, such as office space, laboratory space, and manufacturing space.

Keeping track of work spaces requires tracking several specific types of information. The geographic features of the work space must be known. This includes the location of the building in which the space is located, the floor of the building on which the space is located, and the precise place on the floor of the building that the space is located. Further, the lay-out of the space must be known. In other words, it is necessary to know whether the space is set up, for example, as an office space, a laboratory space, or a manufacturing space. And finally, information on the specifics of the space must be available, such as what sort of business unit is utilizing the space and what types of equipment or furnishings are kept in the space.

A Cartesian coordinate system, based on principles of Euclidean geometry, can be used as a way to track the physical attributes of work spaces. Such a system has the advantage of reducing the work space to a graphical presentation that is easy to understand. A typical coordinate system simply breaks the space down into horizontal and vertical units, with each unit equidistant from the adjacent unit. Typical work place tracking systems present work space attributes pertaining only to a single building floor. Coordinate values are assigned based on the physical lay-out of the space. Specifically, coordinate values are assigned in a way that represents the absolute distances between spaces.

Oftentimes it would be useful for a business to be able to view all of its work space or a specific subset, such as all of its vacant space, in order to determine how best to handle an event such as a move, a merger, an expansion, or other business transaction that will somehow affect how the business utilizes its work spaces.

SUMMARY

Embodiments of the present invention provide a method and system of converting the value assigned to a space in an absolute distance coordinate system from an absolute position value to a unique relative position value. Such conversion enables identification of contiguous spaces present within a defined area.

In at least some embodiments, a contiguity value is used to determine whether two spaces are contiguous according to their unique relative position values. In some embodiments, contiguous spaces are defined as any pairs of spaces whose contiguity value is less than or equal to four.

In at least some embodiments, a unique relative position value is comprised of a horizontal position component, a vertical position component, and a unique identifier.

In at least some embodiments, a report of the contiguous spaces identified is generated. In some embodiments, the report prioritizes the contiguous pairs. The priority order may be from smallest contiguity value to largest contiguity value.

In some embodiments, the invention is implemented via either a stand-alone instruction execution platform or such a platform interconnected with other platforms or data stores by a network, such as a corporate intranet, a local area network, or the Internet. A computer program product or computer program products contain computer programs with various instructions to cause the hardware to carry out, at least in part, the methods and processes of the invention. Data sets may include lists of absolute position values, lists of space attributes, and lists of unique relative position values. Data sets may be stored locally or accessed over a network.

DETAILED DESCRIPTION OF THE INVENTION

Figure 1:
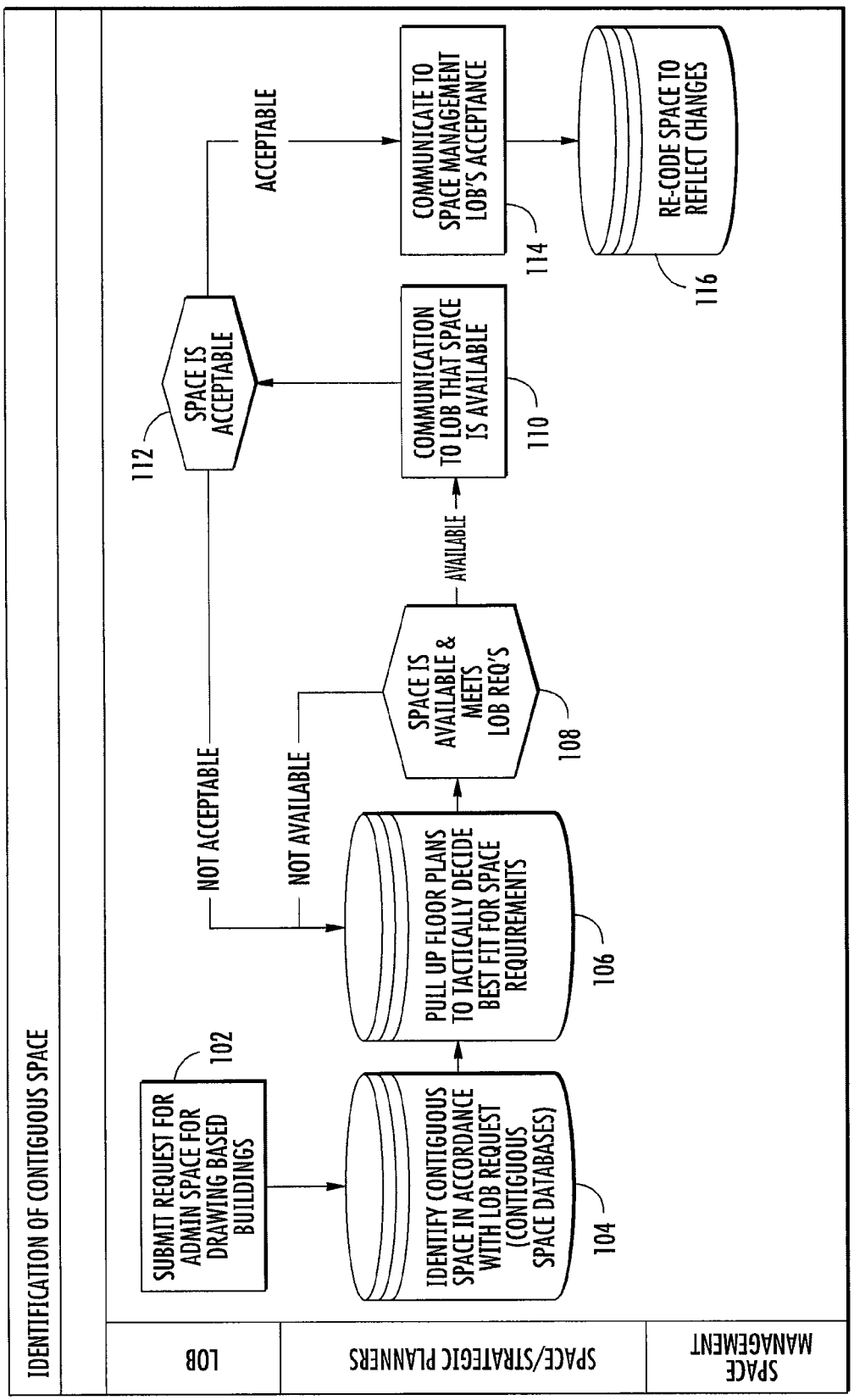
FIG. 1 presents a process for identification of contiguous spaces in an embodiment of the invention.

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

Embodiments of the present invention provide a method and system of converting the value assigned to a space in a coordinate system from an absolute position value to a unique relative position value. Such conversion enables identification of all contiguous spaces within a defined area. Contiguous spaces can only occur when the spaces are located on the same floor within the same building. Thus, although all space data can be searched, search results are presented on a floor-by-floor basis. This enables a user to view all possible options within the business's current space aliquots.

Business spaces are often represented in a graph, wherein coordinates have been assigned to each space based on units representative of absolute distance. Thus, the space is graphically divided up in such a way that the distance between any two contiguous points is the same as the distance between any other two contiguous points. When a user desires to understand the physical lay-out of business spaces and how the different spaces are related to one another, it can be difficult to do so based on coordinates from an absolute distance system. Herein is described a system and computer program product for assigning relative distances to represent relationships between spaces, rather than absolute positions.

The following description is based on an exemplary implementation of an embodiment of the invention in a computer program product used for identifying contiguous spaces available within a business's building facilities. In the embodiment discussed herein below, the business is a financial institution. The contiguous space identification system and computer program product discussed below includes features that enable compliance with regulatory restrictions regarding physical locations of different business functions within a financial institution.

As used herein, the term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses.

In summary, and as an exemplary embodiment, a contiguous space identification system and computer program product is described in more detail as follows. Specifically, one embodiment discussed herein provides tracking of all of a business's operating spaces, including all spaces on a single building floor, multiple floors in a building, or spaces in multiple buildings, cities, counties, states, or countries.

As used herein, the term "space" refers to any and all physical operating areas utilized by a business. In some embodiments, physical operating areas utilized by a business are buildings, or floors in a building. In some embodiments, physical operating areas may include vehicles such as cars, trucks, vans or buses. In some embodiments, physical operating areas may include trains or airplanes. In further embodiments, physical operating areas may include outdoor areas, or any other type of physical area in which business is conducted.

In one embodiment, and as shown in FIG. 1, a high level view of the process of identification of contiguous space is presented. Identification of contiguous space begins when a group within the business (a group is referred to as a Line of Business, or LOB) submits a request for administrative office space 102. The request must be comprised of space attributes desired by the group, including geographic locations to be considered, square footage desired, type of space desired, etc. The search can further be filtered or narrowed, for example, by requesting vacant spaces only. The LOB defines the search and then submits the query.

The query is received in/by the Contiguous Space Database 104. Following the attributes requested in the query, attribute information is searched and spaces with attributes that match the query are retrieved. Note that multiple criteria can be denoted for the search, and the results will be returned as found in an "or" search format. That is to say, every space that meets at least one of the search criterion will be retrieved. This approach provides a maximum number of options to the user.

After the search is completed, a second database 106 presents floor plans to provide visual aid in interpreting and understanding the spaces that met the search query criteria. The LOB can then determine which space seems most likely to meet its needs. Once the LOB has identified a preferred space that is represented as available and meets the LOB's requirements 108, a formal request for use of the space is submitted. If the space is available, the LOB receives information to that effect 110. If the space is not available, the LOB is returned to the second database 106 to determine a next best fit for space requirements.

If the space is available and the LOB received information to that effect, the LOB then has another opportunity to insure that the chosen space is the one that best suits their needs 112.

If it is determined at this stage that the space is acceptable, then the Space Management group receives communication that LOB has accepted the space 114. The LOB's notification of acceptance to Space Management prompts re-coding of the space to reflect changes 116. Changes that should be re-coded include changing the designation from vacant to occupied, and re-coding any other changes to attributes, such as changes in space configuration or conformation. Any of these steps, or combinations thereof, may be human-directed, or may be automated as part of the computer program product.

If the space is not available or not acceptable, the LOB is directed back to the second database 106 for consideration of other options resulting from the search query. Another space can be selected, and the process flow will continue as described above. The options can be presented in a weighted or prioritized fashion to help guide the user in first considering the spaces best matched to the search criteria entered.

Figure 2:
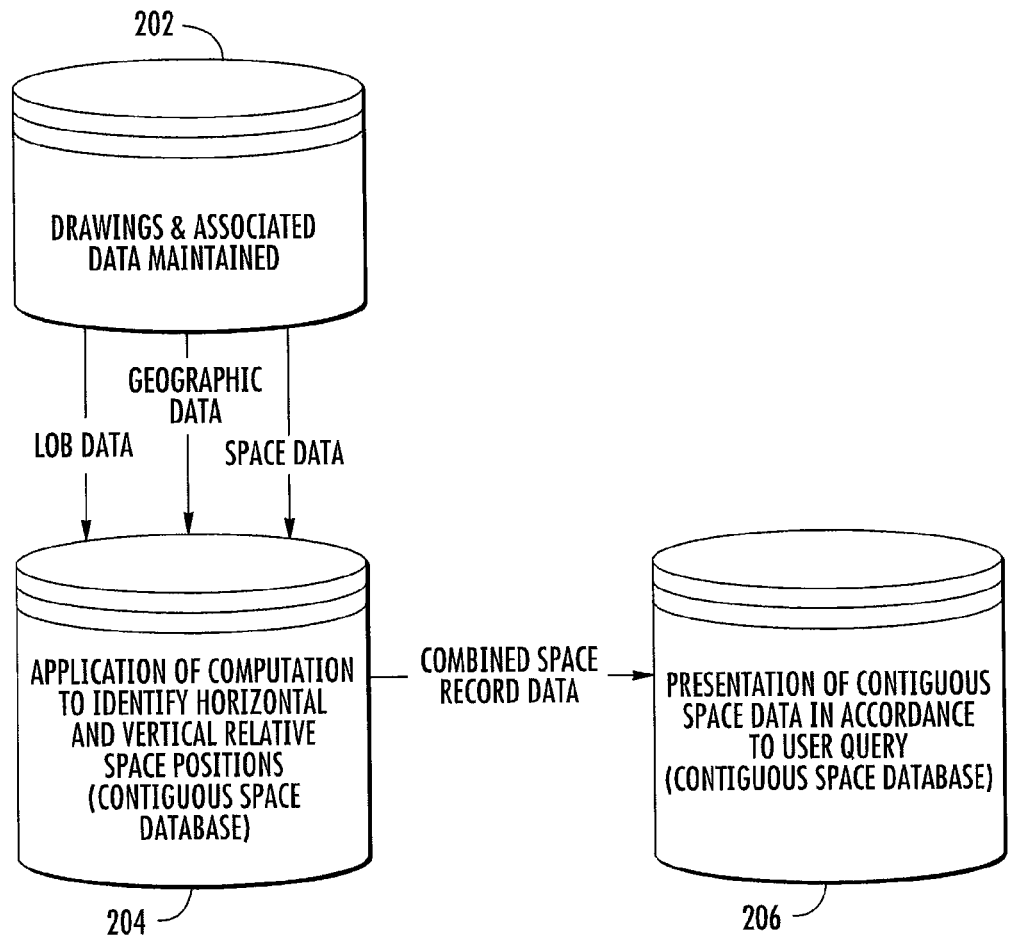
FIG. 2 presents a system flow diagram for the identification of contiguous spaces in an embodiment of the invention.

FIG. 2 presents a system flow diagram for the identification of contiguous spaces. Floor drawings and space attribute data, including grid coordinates for each space, are maintained in a database 202. The contiguous space identification feature then retrieves from database 202 attributes including, but not limited to, LOB data, geographic data, and space data. The attributes for each space include a horizontal and a vertical code that denotes physical location on the floor. These are the absolute position values, which represent absolute distances in the arrangement of spaces based on a grid system.

LOB space attributes include, for example, descriptions of regulatory restrictions that are applied to a LOB. Geographic space attributes include floor, building, street, city, state, county, region, and/or country in which space is located. Work space attributes include, for example, type of space and specification of equipment, furnishings, or materials present in the space Space attributes retrieved from database 202 are then stored in contiguous space database 204. Within contiguous space database 204 is where a plurality of calculations are completed. First, the vertical and horizontal components of the absolute position values are converted to unique relative position values that denote the position of spaces relative to one another. This gives the user a clear idea of which spaces are contiguous to which other spaces, regardless of what the actual configuration of spaces on the floor is. Finally, utilizing the unique relative position values, a second database 206 presents the contiguous space data in accordance to user query.

As used herein, the term "absolute position value" refers to the coordinate value assigned to a space based on absolute distance as represented on a coordinate grid. For each space, there is a horizontal absolute position component and a vertical absolute position component that together form the absolute position value. The details of how a coordinate system is applied to work spaces, such as how the coordinate identifying values are assigned, is clear to one of skill in the art. For example, a Cartesian coordinate system, based on principles of Euclidean geometry, can be used as a way to track the physical attributes of work spaces.

As used herein, the term "unique relative position value" refers to the relative coordinate value assigned to a space based on its position on the coordinate grid. The unique relative position value is a conversion of the absolute position value of a space into a relative position value. The unique relative position value provides information on the space's position relative to other nearby spaces and is comprised of three components: a horizontal component, a vertical component, and a unique identifier. For each space, there is a horizontal relative position component and a vertical relative position component that, together with a unique identifier, form the unique relative position value. The unique relative position value (comprising three components) and the traditional pair of coordinates that defines a space in a Cartesian coordinate system can each be more generally referred to as a "coordinate identifying value". The term "coordinate identifying value" therefore refers to any assigned value given to a space within a coordinate system.

As used herein, the term "attribute" is used to describe features and characteristics of spaces. Attributes are captured as searchable data points, which enable a user to search for spaces with desired attributes. Space attributes include, but are not limited to, horizontal absolute position values, vertical absolute position values, identification of floor location, identification of building location, identification of space status (such as, but not limited to, occupied or vacant), whether the space is furnished, details about the furnishings of furnished spaces, space type (such as, but not limited to, office room, office cubicle, conference room, lunch room, kitchen, laboratory space, manufacturing space, etc.), square footage of space, geographic location information (street address, city, county, state, and country) and any other space attributes defined by the designers of the computer program product, such as any regulatory restrictions applied to the space.

The conversion from absolute position value to unique relative position value occurs as follows. As noted above, the unique relative position value comprises a horizontal relative position component, a vertical relative position component, and a unique identifier. The first space encountered when moving horizontally from what is designated as the origin of the grid (the 0,0 coordinate of a Cartesian coordinate system) is assigned a horizontal component value of "1". If the first horizontal space encountered has an absolute position value of "A1", then all spaces with a horizontal absolute position value of A1 are assigned a horizontal relative position value of 1. If the first horizontal space encountered has an absolute position value of C1, then all spaces with a horizontal absolute position value of C1 are assigned a horizontal relative position value of 1. In the example discussing A1, the next space location, regardless of whether it is located at A2, or B3, or anywhere on the grid, would be assigned a value of 2. The assignment of relative position values continues in this way until all of the spaces have been assigned a horizontal relative position value. The same method is utilized for the vertical components. Finally, each space is assigned a third value that is simply a unique identifier.

After each space's coordinate identifying value is converted from an absolute position value to a unique relative position value, the application compares all pairs of spaces on each floor searched. Each of the three components included in the unique relative position value is analyzed separately. This means that the unique identifier is compared to the unique identifier of each of the other spaces retrieved from the database 202. The horizontal relative position value is compared to the horizontal relative position value of each of the other spaces retrieved from the database 202. The vertical relative position value is compared to the vertical relative position value of each of the other spaces retrieved from the database 202. Three comparison values are thus obtained for each pair of spaces compared. All three comparison values are used in the determination of whether two spaces are contiguous.

The unique identifier is used to insure that a space is not compared to itself. The absolute difference between each pair of horizontal and each pair of vertical relative position values is calculated. The absolute difference is the value that is used to determine which spaces are "contiguous". Spaces are contiguous only if the unique identifiers are different and both the vertical and horizontal relative position values are within a defined number of units of one another.

The numerical designation of the value of "contiguous" as used herein is determined by the designers of the contiguous space identification software program and may be any value, or any number of units, deemed to be useful. The value, or number of units, assigned to the definition of contiguous is referred to as a "contiguity value". In some embodiments, contiguous spaces may be defined as any two spaces on the same floor for which the values of the absolute difference between the horizontal and the vertical relative position values are each equal to one or less. In some embodiments, contiguous spaces may be defined as any two spaces on the same floor for which the values of the absolute difference between the horizontal and the vertical relative position values are each equal to two or less. In some embodiments, contiguous spaces may be defined as any two spaces on the same floor for which the values of the absolute difference between the horizontal and the vertical relative position values are each equal to three or less. In some embodiments, contiguous spaces may be defined as any two spaces on the same floor for which the values of the absolute difference between the horizontal and the vertical relative position values are each equal to four or less. In some embodiments, contiguous spaces may be defined as any two spaces on the same floor for which the values of the absolute difference between the horizontal and the vertical relative position values are each equal to five or less.

It is understood that one of skill in the art could adjust the definition of the contiguity value within the meaning and description of the invention, and that the specific contiguity values listed above are not meant to be limiting. Use of a smaller contiguity value yields a more restricted output of contiguous spaces. Use of a larger contiguity value yields a more broad output of contiguous spaces. The adjustability of the contiguity value provides a dynamic method and system that can be tailored to a specific task.

Many floor plans do not have a perfectly symmetrical grid of workstations throughout the floor. One half of the floor may have a very different space layout, or space configuration, from the other half of the floor. Therefore, when labeling work spaces by their horizontal and vertical absolute distance grid locations, spaces that are horizontally or vertically next to each other on one half of the floor might have spaces that are "in between" them horizontally or vertically, respectively, on the other half of the floor. The end result in an absolute distance system is that contiguous spaces such as those discussed above, with spaces "in between" them on another part of the floor, do not appear to be contiguous.

Figure 3:
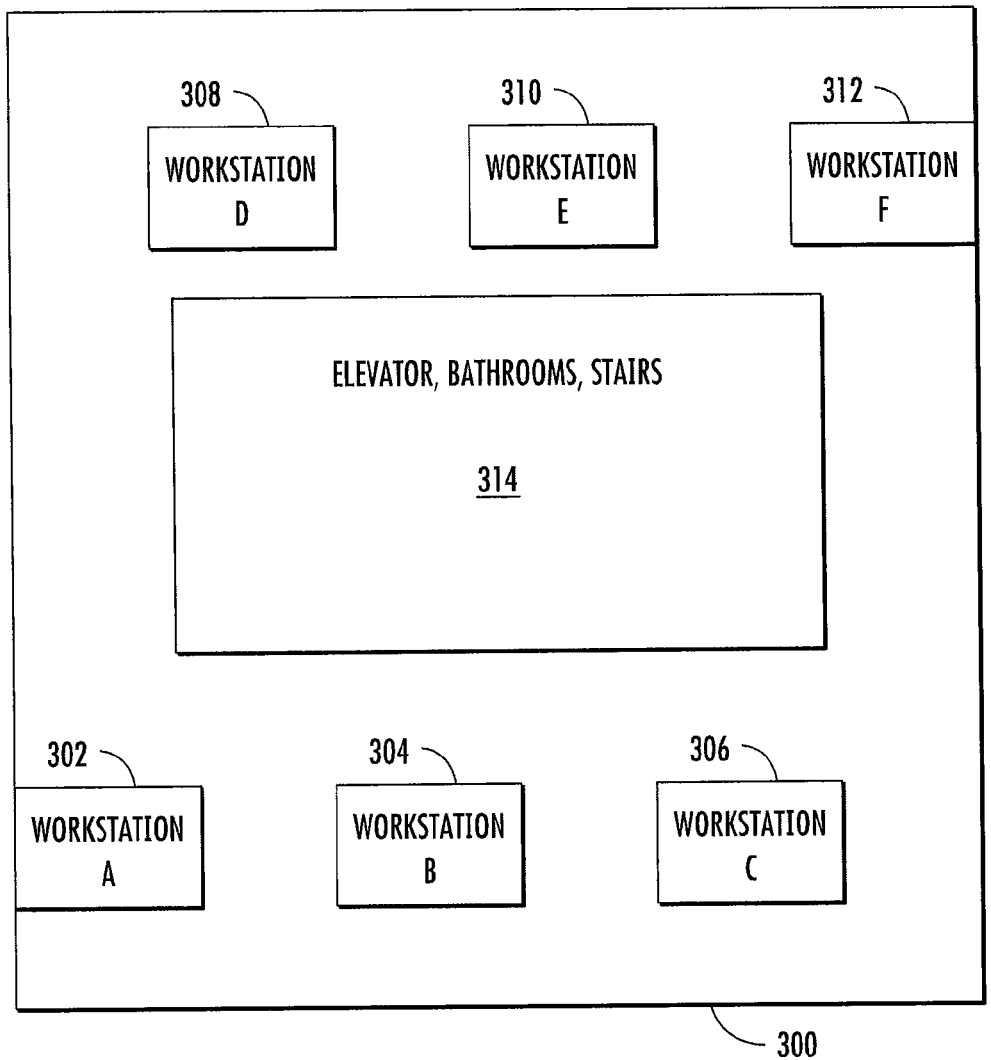
FIG. 3 presents an example floor plan with representations of work spaces.

For example, FIG. 3 shows a grid display of a building floor 300, with workstations demarcated. Workstation A 302 is the furthest to the left on the horizontal axis, so its "horizontal component" is 1. Workstation A 302 and Workstation B 304 are contiguous; there are no other workstations between them. However, Workstation D 308 is the second most leftward workspace, so its horizontal component in an absolute distance coordinate system is 2. Workstation B 304 is the next most leftward workspace, so its horizontal component in an absolute distance coordinate system is 3.

Workstations A 302 and B 304 are contiguous, but horizontally they are two "units" (or values) apart. It is due to such situations, which are quite common when viewing the physical lay-out of floor spaces, that it can be useful to measure contiguity by accepting as contiguous work space pairs that are several "units" apart. The conversion of coordinate values from absolute distance values to relative distance values removes any doubt as to whether two work spaces are contiguous, regardless of the lay-out of the overall physical space or whether two sides of a given space (such as a building floor) are laid out differently with regard to the arrangement of the work spaces.

Following is a description of a series of screen shots of user screens presented according to example embodiments of the invention. It is understood that the user screen shots provided herein are intended as examples of how the contiguous space feature may be presented to a user and are not meant to be limiting. One of skill in the art would understand that many different presentations of the contiguous space feature are possible.

Figure 4:
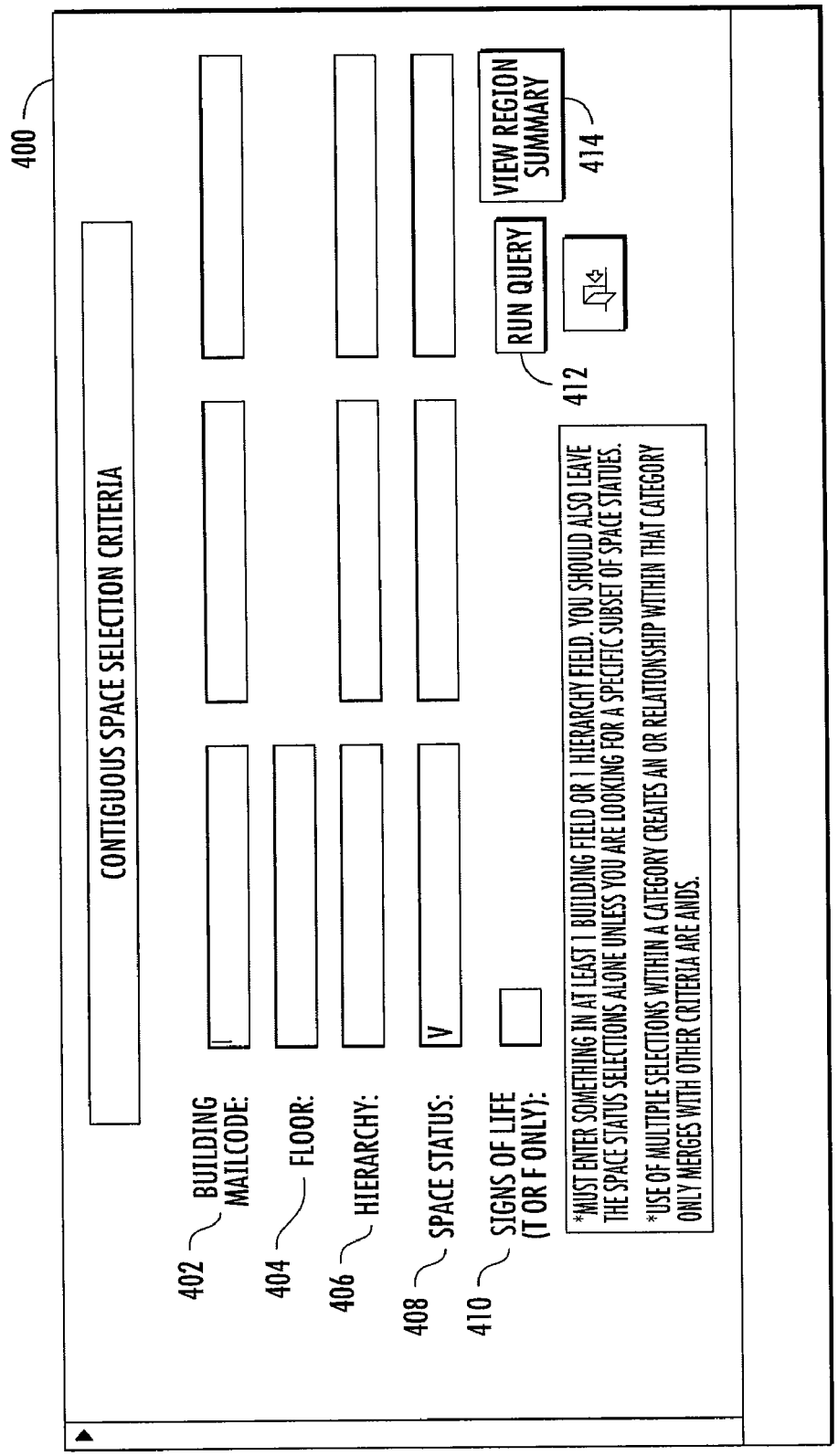
FIG. 4 presents a screen shot a user may see when first initiating use of the contiguous space identifying computer software program.

FIG. 4 presents a screen shot a user may see when first initiating use of the contiguous space identifying computer software program. The Contiguous Space Selection Criteria screen 400 provides for input to tailor a search for contiguous spaces. Search criteria comprise categories including building identification 402, floor of building 404, hierarchy 406, space status 408, and signs of life 410. Building identification 402 is an identifier for buildings of interest. It is a mail code in the example presented in FIG. 4. Particular floors 404 in buildings of interest may be specified. Hierarchy 406 refers to cost center and general ledger accounting placement characteristics of a space. Space status 408 may be coded as either occupied, shadow vacant, or vacant. Shadow vacancy refers to circumstances in which a space is coded in the database as occupied, but a real-life check of the space indicates that no one is using it. Space status refers to the database entry dictated by the business unit in charge of the space. "Signs of life" 410 refers to a real-life look at a space, which may indicate something different than the space status as listed by the business unit in charge of the space. To determine "signs of life", someone may go to the location of and physically look at a space to determine if it appears to be occupied by a worker or not. An occupied space may be comprised of things such as, but not limited to, a person actually sitting and conducting work in the space, presence of personal items such as coffee mugs and family photographs, presence of work-related items such as a telephone and a personal computer, etc. The coding of a work space as having "signs of life" is somewhat subjective, may differ according to the type of work space, and may be defined however the designers of the computer software program wish to define it, without limiting the scope of the invention herein.

In the example presented in FIG. 4, the user is required to enter search criteria in at least one of the building fields 402 or at least one of the hierarchy fields 406. The user may enter multiple search criteria for each selection criteria category, except for "signs of life" 410 (which can only be designated as "true" or "false").

When the user clicks on the Run Query button 412, the search terms entered into the boxes are applied to the data and a report of spaces matching the search terms is generated. The report generated may prioritize the contiguous spaces from lowest contiguity value to highest contiguity value.

Figure 5:
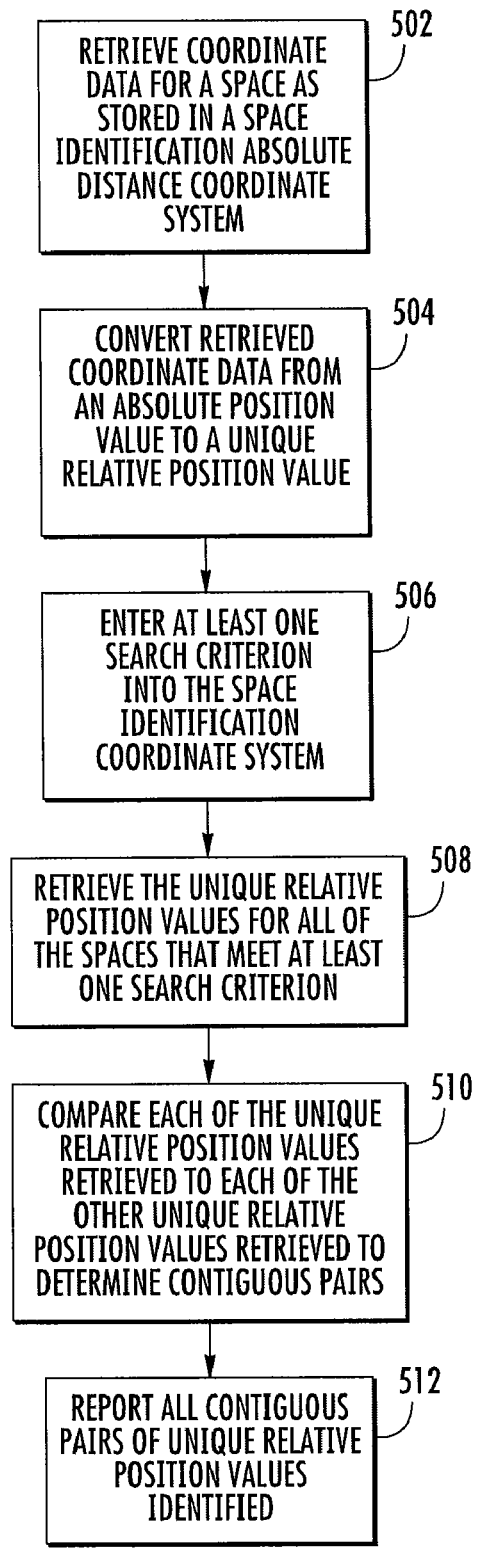
FIG. 5 is a flow chart according to example embodiments of the invention.

FIG. 5 is a flow chart according to example embodiments of the invention. The flowchart is organized as a series of process blocks. In particular, the flowchart presents an embodiment of the present invention. The system utilizes a database populated with space data organized in an absolute distance coordinate system 502, and retrieves the space data as stored within the absolute distance coordinate system 502.

The space data retrieved from the absolute distance coordinate system are converted from absolute position values to unique relative position values, as described above. The unique relative position values can then be searched using at least one search criterion 506. This allows a user to specify desired space attributes, such as LOB data, geographic data, and individual space data. All data that meet at least one search criterion are retrieved 508. Note that if a plurality of search criteria are entered, the search is conducted as if the search criteria were entered in an "or" search format. This means that all data will be retrieved that meet at least one search criteria.

Comparisons are made between every possible pairing of unique relative position values retrieved to determine contiguous pairs 510. All pairs determined to be contiguous are reported 512. The comparison and the determination of which pairs are contiguous are conducted as described above. The reporting may be in a prioritized fashion, with the contiguous pairs that meet the most search criteria presented first.

Figure 6:
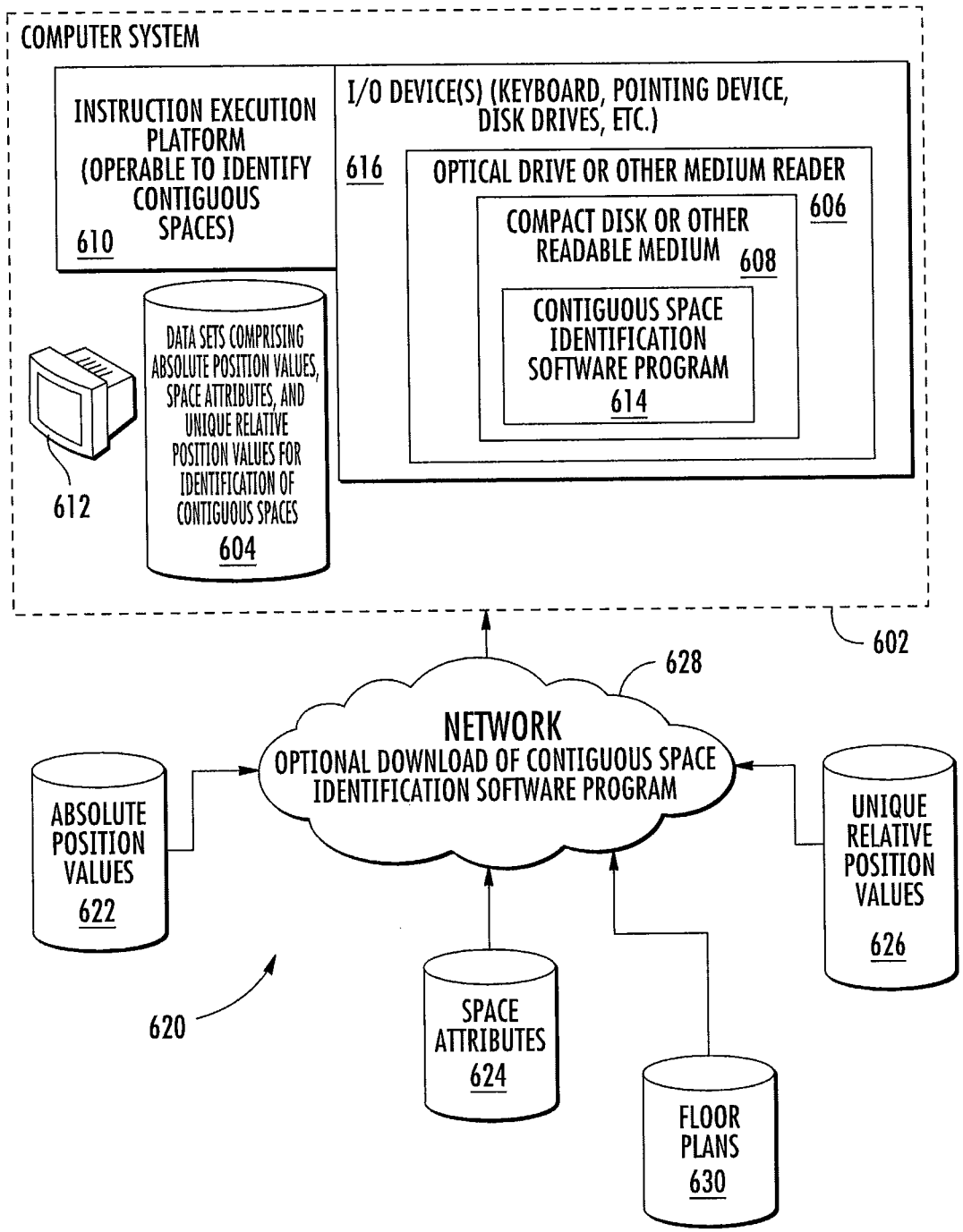
FIG. 6 is a system block diagram according to example embodiments of the invention.

FIG. 6 is a system block diagram according to example embodiments of the invention. FIG. 6 actually illustrates two alternative embodiments of a system implementing the invention. System 602 can be a workstation or personal computer. System 602 can be operated in a "stand-alone" mode. The system includes a fixed storage medium, illustrated graphically at 604, for storing programs and/or macros which enable the use of an embodiment of the invention. In a stand-alone implementation of the invention, fixed storage 604 can also include the data sets which are necessary to implement an embodiment of the invention. In this particular example, the input/output devices 616 include an optical drive 606 connected to the computing platform for loading the appropriate computer program product into system 602 from an optical disk 608. The computer program product includes a computer program or programs with instructions or code for carrying out the methods of the invention. Instruction execution platform 610 of FIG. 6 includes a microprocessor and supporting circuitry and can execute the appropriate instructions and display appropriate screens on display device 612.

FIG. 6 also illustrates another embodiment of the invention in which case the system 620 which is implementing the invention includes a connection to data stores, from which lists of space absolute position values, space attributes, and space unique relative position values can be retrieved, as shown at 622, 624 and 626, respectively. The connection to the data stores or appropriate databases can be formed in part by network 628, which can be an intranet, virtual private network (VPN) connection, local area network (LAN) connection, or any other type of network resources, including the Internet. Data sets can be local, for example on fixed storage 604, or stored on the network, for example in data store 622, 624 or 626.

A computer program which implements all or parts of the invention through the use of systems like those illustrated in FIG. 6 can take the form of a computer program product residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the Internet or any other type of network. Computer program instructions which implement the invention can reside on or in any medium that can contain, store, communicate, propagate or transport the program for use by or in connection with any instruction execution system, apparatus, or device. Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Specific embodiments of an invention are described herein. One of ordinary skill in the computing arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

The invention claimed is:

1. A method of identifying contiguous physical operation areas in a space identification coordinate system, the method comprising:
retrieving, via a processing device, coordinate data for a physical operation area utilized by a business represented in an absolute distance space identification coordinate system;
converting, via a processing device, the coordinate data for the physical operation area in the space identification coordinate system from an absolute position value to a unique relative position value, wherein the unique relative position value is assigned to the physical operation area based on absolute distance based on a grid;
searching at least one search criterion;
retrieving the unique relative position values for all of the physical operation areas that meet the at least one search criterion;
comparing, via a processing device, each of the unique relative position values retrieved to each of the other unique relative position values retrieved, wherein the comparison reveals whether the pair compared is contiguous according to a predefined contiguity value, wherein a contiguous pair is defined as any two physical operation areas on a single floor of a building utilized by the business for which a value of an absolute difference between the unique relative position values for the two physical operation areas is equal to or less than the predefined contiguity value; and
reporting contiguous pairs of unique relative position values retrieved.

2. The method of claim 1, wherein the unique relative position value comprises a horizontal position component, a vertical position component, and a unique identifier.

3. The method of claim 1, wherein the space identification coordinate system comprises attribute data for each physical operation area.

4. The method of claim 3, wherein the attribute data comprises group data, geographic data, and individual physical operation area data.

5. The method of claim 4, wherein the group data comprises regulatory requirements.

6. The method of claim 5, wherein the regulatory requirements are adhered to when reporting contiguous pairs of unique relative position values.

7. The method of claim 4, wherein the geographic data is selected from the group consisting of identification of building floor, building, street, city, state, county, region, and country in which the physical operation area is located.

8. The method of claim 4, wherein the individual space data comprises specification of physical operation area type, equipment, furnishings, or materials present in the physical operation area.

9. The method of claim 3, wherein the reporting comprises the attribute data for each physical operation area represented in a contiguous pair.

10. The method of claim 1, wherein the contiguity value is less than or equal to four.

11. The method of claim 10, wherein the reporting prioritizes the contiguous pairs.

12. The method of claim 11, where prioritization is from smallest contiguity value to largest contiguity value.

13. The method of claim 1, wherein the at least one search criterion comprises specification of at least one of the group consisting of building identification, floor of building, hierarchy, physical operation area status, and signs of life.

14. A computer program product comprising a non-transitory computer readable medium for identifying contiguous physical operation areas in a space identification coordinate system, the non-transitory computer readable medium including computer program code comprising:
instructions for retrieving coordinate data for a physical operation area utilized by a business represented in an absolute distance space identification coordinate system;
instructions for converting the coordinate data for the physical operation area in the space identification coordinate system from an absolute position value to a unique relative position value, wherein the unique relative position value is assigned to the physical operation area based on absolute distance based on a grid;
instructions for searching at least one search criterion;
instructions for retrieving the unique relative position values for all of the psychical operation areas that meet the at least one search criterion;
instructions for comparing each of the unique relative position values retrieved to each of the other unique relative position values retrieved, wherein the comparison reveals whether the pair compared is contiguous according to a predefined contiguity value, wherein a contiguous pair is defined as any two physical operation areas on a single floor of a building utilized by the business for which a value of an absolute difference between the unique relative position values for the two physical operation areas is equal to or less than the predefined contiguity value; and
instructions for reporting contiguous pairs of unique relative position values retrieved.

15. The computer program product of claim 14, wherein the unique relative position value comprises a horizontal position component, a vertical position component, and a unique identifier.

16. The computer program product claim 14, wherein the space identification coordinate system comprises attribute data for each physical operation area.

17. The computer program product of claim 16, wherein the attribute data comprises group data, geographic data, and individual physical operation area data.

18. The computer program product of claim 17, wherein the group data comprises regulatory requirements.

19. The computer program product of claim 18, wherein the regulatory requirements are adhered to when reporting contiguous pairs of unique relative position values.

20. The computer program product of claim 16, wherein the geographic data is selected from the group consisting of identification of building floor, building, street, city, state, county, region, and country in which the physical operation area is located.

21. The computer program product of claim 16, wherein the individual physical operation area data comprises specification of physical operation area type, equipment, furnishings, or materials present in the physical operation area.

22. The computer program product of claim 16, wherein the reporting comprises the attribute data for each physical operation area represented in a contiguous pair.

23. The computer program product of claim 14, wherein the contiguity value is less than or equal to four.

24. The computer program product of claim 23, wherein the reporting prioritizes the contiguous pairs.

25. The computer program product of claim 24, wherein the prioritization is from smallest contiguity value to largest contiguity value.

26. The computer program product of claim 14, wherein the at least one search criterion comprises specification of at least one of the group consisting of building identification, floor of building, hierarchy, physical operation area status, and signs of life.

27. A system for identifying contiguous physical operation areas in a space identification coordinate system, the system comprising:
a memory device having computer readable program code store thereon; and
a processing device operatively coupled to the memory device, wherein the processing device is configured to execute the computer readable program code to:
identify contiguous physical operation areas utilized by a business from data stored as unique relative position values based on a predefined contiguity value, wherein the unique relative position value is assigned to the physical operation area based on absolute distance based on a grid, and wherein a contiguous pair of physical operation areas is defined as any two physical operation areas on a single floor of a building utilized by the business for which a value of an absolute difference between the unique relative position values for the two physical operation areas is equal to or less than the predefined contiguity value; and
store lists of absolute position values, lists of physical operation area attributes, and lists of unique relative position values.

28. The system of claim 27, wherein the processor is further configured to store lists of floor plans.

29. The system of claim 27, wherein the processor is further configured to re-code the lists of physical operation area attributes to reflect physical operation area changes.

30. An apparatus for identifying contiguous physical operation areas in a space identification coordinate system, the apparatus comprising:
a memory device having computer readable program code store thereon; and
a processing device operatively coupled to the memory device, wherein the processing device is configured to execute the computer readable program code for:
retrieving coordinate data for a physical operation area utilized by a business represented in an absolute distance space identification coordinate system;
converting the coordinate data for the physical operation area in the space identification coordinate system from an absolute position value to a unique relative position value wherein the unique relative position value is assigned to the physical operation area based on absolute distance based on a grid;
searching at least one search criterion;
retrieving the unique relative position values for all of the physical operation areas that meet the at least one search criterion;
comparing each of the unique relative position values retrieved to each of the other unique relative position values retrieved, wherein the comparison reveals whether the pair compared is contiguous according to a predefined contiguity value, wherein a contiguous pair is defined as any two physical operation areas on a single floor of a building utilized by the business for which a value of an absolute difference between the unique relative position values for the two physical operation areas is equal to or less than the predefined contiguity value; and
reporting contiguous pairs of unique relative position values retrieved.

* * * * *

UNITED STATES PATENT AND TRADEMARK OFFICE
CERTIFICATE OF CORRECTION

PATENT NO. : 8,335,788 B1
APPLICATION NO. : 12/259543
DATED : December 18, 2012
INVENTOR(S) : Chris A. Fromme and James Wimmers It is certified that error appears in the above-identified patent and that said Letters Patent is hereby corrected as shown below:

In the Claims:

Claim 16, Column 10, Line 62. Include --(of)-- after "product"

Signed and Sealed this
Twenty-third Day of April, 2013

Teresa Stanek Rea
*Acting Director of the United States Patent and Trademark Office*